(12) United States Patent
Rivas Lopez et al.

(10) Patent No.: US 12,734,483 B2
(45) Date of Patent: Sep. 15, 2026

(54) ONE-WAY PRESSURE EXCHANGE DEVICE FOR REVERSE OSMOSIS DESALINATION PLANTS

(71) Applicants: Miguel Angel Rivas Lopez, Madrid (ES); Manuel Latorre Carrion, Cartagena (ES)

(72) Inventors: Miguel Angel Rivas Lopez, Madrid (ES); Manuel Latorre Carrion, Cartagena (ES)

( * ) Notice: Subject to any disclaimer, the term of this patent is extended or adjusted under 35 U.S.C. 154(b) by 363 days.

(21) Appl. No.: 18/566,676

(22) PCT Filed: May 31, 2022

(86) PCT No.: PCT/ES2022/070332

§ 371 (c)(1),
(2) Date: Dec. 4, 2023

(87) PCT Pub. No.: WO2022/254067

PCT Pub. Date: Dec. 8, 2022

(65) Prior Publication Data

US 2024/0269615 A1 Aug. 15, 2024

(30) Foreign Application Priority Data

Jun. 4, 2021 (ES) ................................ ES202130516

(51) Int. Cl.
*B01D 61/02* (2006.01)
*B01D 61/06* (2006.01)
(Continued)

(52) U.S. Cl.
CPC ........... *B01D 61/06* (2013.01); *B01D 61/025* (2013.01); *C02F 1/441* (2013.01);
(Continued)

(58) Field of Classification Search
CPC ...... B01D 61/02; B01D 61/025; B01D 61/06; B01D 61/12; B01D 2313/10;
(Continued)

(56) References Cited

U.S. PATENT DOCUMENTS 5,306,428 A 4/1994 Tonner
6,579,451 B1 * 6/2003 Avero .................... B01D 61/10 210/257.2

(Continued)

FOREIGN PATENT DOCUMENTS

EP 1719920 A1 8/2006

OTHER PUBLICATIONS

ISR; Spanish Patent Office; Madrid; Jul. 14, 2022.

*Primary Examiner* — Bradley R Spies
(74) *Attorney, Agent, or Firm* — PatShegen IP; Moshe Pinchas

(57) ABSTRACT

Disclosed is a one-way pressure exchange device (1) for reverse osmosis desalination plants of the type comprising a pair of pumping circuits (2, 3) for pumping a low-pressure inflow of seawater in contact with another high-pressure inflow of reject brine. The device comprises: a first selector valve (11) for selecting an alternative inlet into the pumping circuits (2, 3), which is connected to an inlet collector (5) for collecting reject brine from the osmosis device (100); a second selector valve (12) for selecting an alternative outlet from the pumping circuits (2, 3), which is connected to an outlet collector (6) for collecting low-pressure reject brine for discharge to the sea; and retention valves (21, 22, 23, 24), wherein the phases of the first selector valve (11) and the second selector valve (12) are arranged crosswise.

6 Claims, 3 Drawing Sheets

(51) Int. Cl.
*C02F 1/44* (2023.01)
*C02F 103/08* (2006.01)

(52) U.S. Cl.
CPC .... *B01D 2313/18* (2013.01); *B01D 2313/246* (2013.01); *C02F 2103/08* (2013.01); *C02F 2303/10* (2013.01)

(58) Field of Classification Search
CPC . B01D 2313/18; B01D 2313/246; C02F 1/44; C02F 1/441; C02F 2303/10; F04F 13/00
See application file for complete search history.

(56) References Cited

U.S. PATENT DOCUMENTS

| | | | |
|---|---|---|---|
| 2006/0054223 | A1 | 3/2006 | Baumgarten et al. |
| 2007/0289904 | A1 | 12/2007 | Oklejas |
| 2009/0242471 | A1 | 10/2009 | Shinoda et al. |
| 2017/0216774 | A1 | 8/2017 | Warsinger et al. |

* cited by examiner

ONE-WAY PRESSURE EXCHANGE DEVICE FOR REVERSE OSMOSIS DESALINATION PLANTS

OBJECTIVE OF THE INVENTION

This invention refers to a one-way pressure exchange device for desalination plants, to recover the energy delivered to the reverse osmosis (RO) membranes.

BACKGROUND OF THE INVENTION

Is well known that desalination by RO membranes has eased the development of territories nearby the sea with lack of sweet water resources but is also known that this desalination procedure consumes enormous quantities of energy, once the seawater must be circulated at high pressure through the RO membranes.

To minimize the energy consumption, several energy recovery devices (ERD) have been developed; some of them are based on the utilization of the high-pressure of the reject brine in the outlet of the RO membranes, exchanging it with the low pressure of the seawater entering in the system, by means of isobaric chambers.

Fundamentally, these ERD are composed of one or more pairs of circuits wherein there are alternative and antiparallel flows of seawater and reject brine. In the circuit that is already filled with low-pressure seawater, the high-pressure reject brine coming from the RO membranes enters; the high-pressure of the reject brine is transmitted to the sweater through a kind of hydraulic piston and pushed to the membranes. Once the reject brine hast lost its pressure, is pushed out to the discharge by the low-pressure seawater entering the other circuit. Then, the cycle is repeated. This process must be performed by pairs, to get coincidence of the pushing the high-pressure seawater to the RO membranes in one of the circuits with the discharge in the other circuit of the low-pressure reject brine to the evacuation line. This is an alternative and antiparallel operation (when one circuit of the pair pressurizes, the other circuit of the pair de-pressurizes), what ensures a continuous high-pressure seawater supply to the RO membranes.

The configuration of the current isobaric chambers is reciprocating, obliging to the inversion of the way of flow in the circuits during the filling and emptying of the entering fluids; this means that the velocity energy of the entering fluids is not used and that there are zeros of liquid velocities. Some of the ERD currently available have physical elements separating the seawater and reject brine flows due to the low frequency of the reciprocating cycles and the long period of contact between the two fluids.

Most of the ERD currently dominating the World's market, have very limited production capacity (300 USgpm brine flow=1.338 m3/day of desalted water production); thus, many of those ERD must operate together to achieve the total production of a desalination plant. Some of them have rotating valves operating at very speed (up to 1.200 rpm) with very small running clearances requiring very high grades of pre-filtration of the inlet seawater (3-10 μm). Nevertheless, despite of those high grades of pre-filtration, they have high rates of wear and blocking and need a backpressure created in the discharge line of around 1.5 bar.

Due to the absolute dominant position of one of the current manufacturers of ERD, and the subsequent difficulty of introducing new products, the evolution of the ERD systems for desalination plants is stagnant since about 20 years. There are many and very different patents in the field of "Isobaric Chambers for Energy Recovery" of the reject brine in desalination plants. We are mentioning here below some of them:

- US 2009/0180903 A1: Rotary Pressure Transfer Device. ERI.
- U.S. Pat. No. 9,739,128 B2: Rotary Isobaric Pressure Exchanger with Flush System. ERI.
- U.S. Pat. No. 7,168,927 B2: Pressure Exchange System. KSB.
- U.S. Pat. No. 7,201,557 B2: Pressure Exchange System. KSB.
- US 2006/0054223 A1: Valve Unit for Pressure Exchanger Installations. KSB.
- US 2012/0061309 A1: Seawater Desalination System and Energy Exchange Chamber. EBARA.
- EP 3109470 B1: Hydraulic Machine Arrangement. DANFOSS.
- US 2016/0230788 A1: Hydraulic Machine. DANFOSS.
- U.S. Pat. No. 5,306,428 A: Method of Recovering Energy from Reverse Osmosis Waste Streams. DWEER.
- WO 2012/138367 A1: Pressure Exchange. DWEER.
- WO 2017/071720 A1: Energy Recovery Device for Water Desalination Plants Double Acting Cylinders (D-A-C). DWEER.
- US 2009/0185917 A1: Pressure Exchanger. DWEER.
- WO 1990/17028 A1: Pressure Exchanger. DWEER.
- EP 1095693 B1: Water Desalting Installation Trough Reverse Osmosis with Pressurized Supply Tank in Continuous Kinetic Cycle, Manuel Barreto.
- WO 2011/070185 A1: Hybrid Modular System of Static Chambers with Virtual Rotation for Saving Energy in Reverse Osmosis Desalination. Manuel Barreto.
- US 2015/0184502 A1: Rotary Isobaric Pressure Exchanger System with Lubrication System. ISOBARIX. Leif Hauge,
- U.S. Pat. No. 5,338,158 A: Pressure Exchange having Axially Inclined Rotor Ducts. ISOBARIX. Leif Hauge.
- US 2013/0294944 A1: Pressure Exchange and Performance Adjustment Method of Pressure Exchanger. ISOBARIX. Leif Hauge.

However, we understand that none of them solve the problems described before fully satisfactorily.

DESCRIPTION OF THE INVENTION

The one-way pressure exchanger for reverse osmosis desalination plants of this invention, is of a type comprising, at least, a pair of discharge loops for the circulation of the entering low-pressure seawater in contact with another entering flow of high-pressure reject brine, for the transmission of the pressure differential of the entering reject brine to the entering seawater, prior to discharge to the RO desalination membranes; according to the invention, it comprises:

- A first selecting valve providing alternative entrance to the discharge loops, connected to the inlet of every pair of discharge loops and to the inlet of a collector of high-pressure reject brine coming from the RO membranes,
- A second selecting valve with alternative entrance from the discharge loops, connected to the outlet of every pair of discharge loops and to the outlet of the collector of low-pressure reject brine to evacuate it to the sea,
- A first unidirectional non-return valve connected to the low-pressure seawater inlet at the beginning of the first discharge loop, mounted downstream of the first selecting valve, providing circulation of low-pressure seawater from the seawater inlet towards the first discharge loop, allowing the inlet of seawater when the pressure at the beginning of the first discharge loop is below the seawater pressure and avoiding the outlet of seawater when the pressure at the same is above the seawater pressure due to the inlet of high-pressure reject brine, A second unidirectional non-return valve connected to the low-pressure seawater inlet, at the beginning of the second discharge loop, mounted downstream of the first selecting valve, providing circulation of low-pressure seawater from the seawater inlet towards the second discharge loop, allowing the inlet of seawater when the pressure at the beginning of the second discharge loop is below the seawater pressure and avoiding the inlet of seawater when the pressure at the same is above the seawater pressure due to the inlet of high-pressure reject brine, A third unidirectional non-return valve connected to the end of the first discharge loop and to a by-pass line of high-pressure seawater to the inlet of the RO membranes, mounted upstream of the second selecting valve, providing circulation of high-pressure seawater from the first loop towards the RO membranes, allowing the outlet of seawater to the RO membranes when the pressure in the first discharge loop increases due to the pushing of the high pressure reject brine and avoiding the outlet of reject brine through that by-pass line when the pressure in the first discharge loop is below the pressure at the inlet of the RO membranes. and, A fourth unidirectional non-return valve connected to the end of the second discharge loop and to a by-pass line of high-pressure seawater to the inlet of the RO membranes, mounted upstream of the second selecting valve, providing circulation of high-pressure seawater from the second loop towards the RO membranes, allowing the outlet of seawater to the RO membranes when the pressure in the second discharge loop increases due to the pushing of the high pressure reject brine and avoiding the outlet of reject brine through that by-pass line when the pressure in the second discharge loop is below the pressure at the inlet of the RO membranes, and, Where the phases of the first selecting valve and of the second selecting valve are suited in a crossed manner (meaning that, when the inlet to the first discharge loop in the first selecting valve is opened, the outlet from the first loop though the second selecting valve is closed, and vice versa, so that the high pressure seawater in the first and second discharge loops get out, respectively, through the third and fourth non-return valves and that the low-pressure reject brine in the first and second discharge loops is compensated by the inlet of low-pressure seawater, respectively, through the first and second non-return valves); all this will produce a continuous discharge of high-pressure seawater to the RO membranes, alternatively from the first discharge loop or the second discharge loop.

This way, it is achieved the enormous advantage of delivering a continuous and one-way operating flow, making use of the velocity energy available in the two fluids, once the way of the flow in the inside of the discharge loops does not change; both the use of the pressure and of the velocity energy of the high-pressure reject brine will be maximized to transmit it to the feed flow of low-pressure seawater.

Geometrically, the ensemble is designed to achieve that the flow velocities in the inner parts of the pressure exchange system are kept within the range of optimum hydraulic values, increasing the overall efficiency, and reducing the friction losses in the hydraulic equipment.

Selecting valves per every pair of discharge loops provided with low speed turning rotors will be implemented to guarantee that the contact wear is minimized and that the periods between repairs or replacements are extended.

The running clearance of the turning rotors will be close enough to reduce the volumetric losses between the high-pressure and low-pressure areas but also wide enough to allow a good lubrication and do not need high grades of filtration (3-10 μm) of the inlet seawater.

This device does not require any physical element separating the two fluids (seawater and reject brine), since the time of contact between them is rather short, what simplifies the design and avoids the problems related to the maintenance of the equipment.

Therefore, this device will increase notably the harnessing of the total energy of the high-pressure reject brine once there are not changes in the way of flows nor any loss in the velocity energy of the reject brine and seawater flows.

All the hydraulic components have been carefully analysed by means of computer aided design (CAD), to minimize the internal friction losses and the backpressure needed in the outlet of low-pressure reject brine.

Once this concept can be scaled-up to any constructive size, it is achievable that only one of these devices is able to cover the production capacity of desalted water of most of the RO racks used commercially. On the other hand, several of these devices could be mounted in parallel in desalination plants using Pressure Centre configuration. All that will simplify widely the seawater feed & discharge and the reject brine feed and evacuation piping layouts and will significantly reduce the footprint and volume of the ERD system in the desalination plants.

By order of importance, the main advantages of the device proposed here are:

The high efficiency of the of the maximum utilization of the energy of velocity of the liquids handled.

The avoidance of high grade of filtration of the inlet seawater.

The possibility of escalation to desalination racks with high production.

The low backpressure required in the evacuation of low-pressure reject brine.

The low rates of wear and maintenance.

The low noise levels.

It is not necessary a physical separation between the reject brine and the seawater.

PREFERRED EXECUTION OF THE INVENTION

Figure 1:
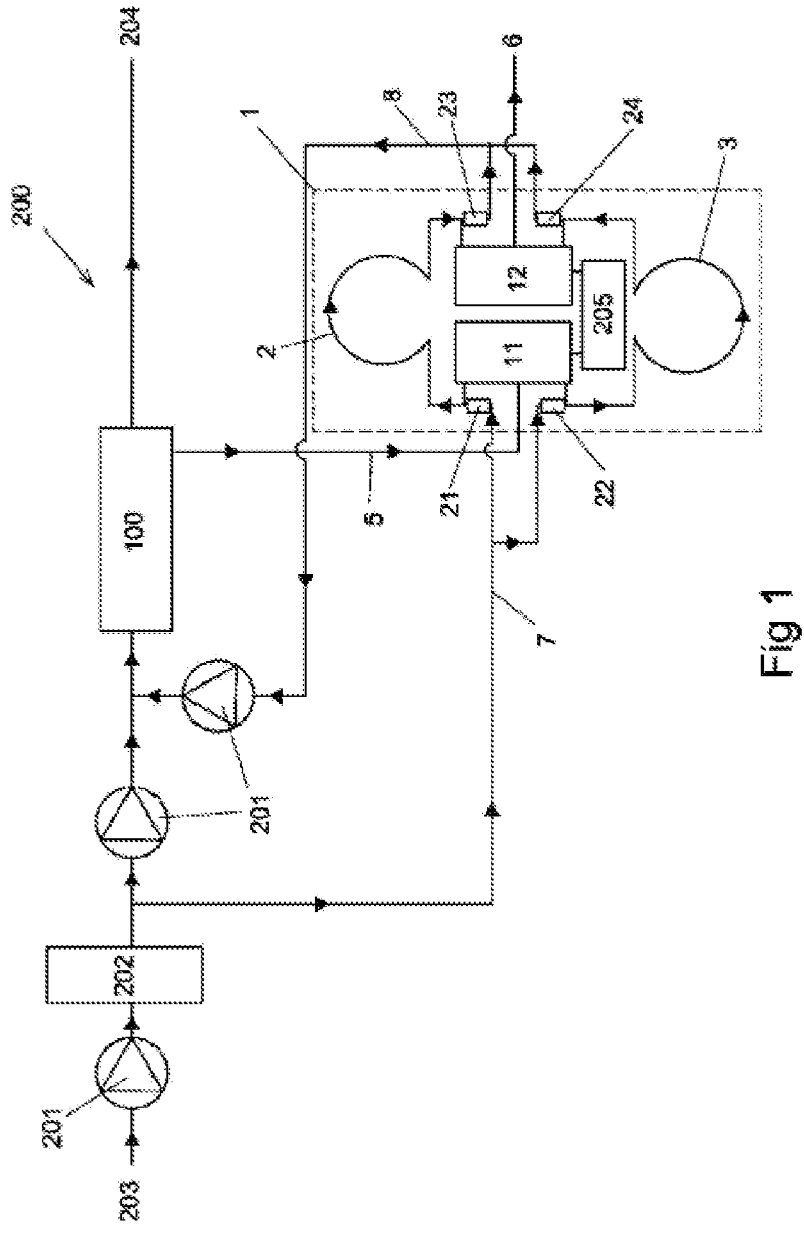
FIG. 1. —Shows a basic process scheme of a RO desalination plant incorporating the device of invention.
Figure 2A:
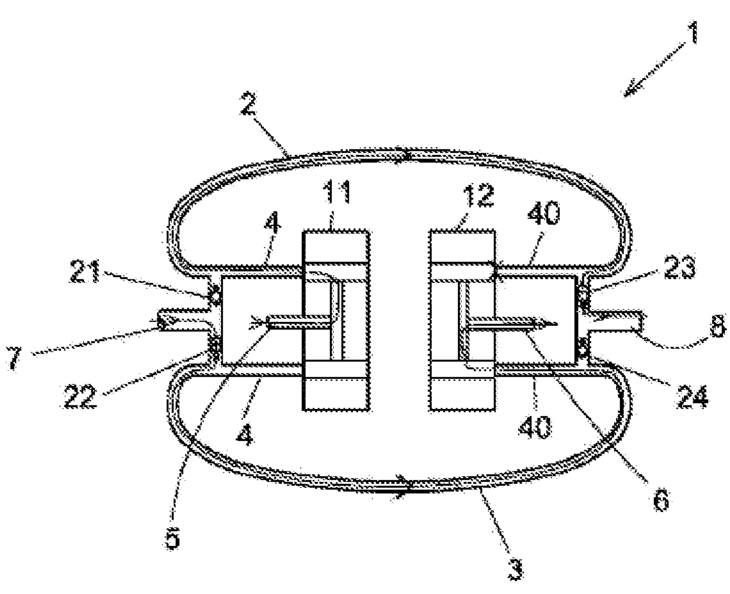
FIGS. 2A & 2B. —Show two schematic views of the device of invention with symmetric phases.
Figure 2B:
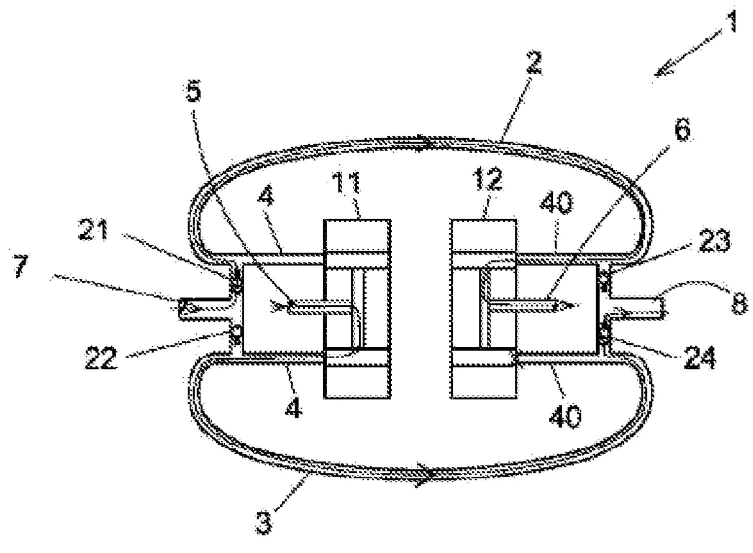

The one-way pressure exchange device (1) for desalination plants (200) by reverse osmosis (see FIG. 1) is of the type comprising, at least, a pair of discharge loops (2,3) for the circulation of the entering low-pressure seawater flow in contact with another entering flow of high-pressure reject brine, for the transmission of the pressure differential of the entering reject brine to the entering seawater, prior to discharge to the RO desalination membranes (100), and that, according to the invention, it comprises (see also FIGS. 2A and 2B):

- A first selecting valve (11) providing alternative entrance to the discharge loops (2,3), connected to the inlet (4) of every pair of discharge loops (2,3) and to the inlet of a collector (5) of high-pressure reject brine coming from the RO membranes (100),
- A second selecting valve (12) with alternative entrance from the discharge loops (2,3), connected to the outlet (40) of every pair of discharge loops (2,3) and to the outlet of the collector (6) of low-pressure reject brine to discharge it to the sea,
- A first unidirectional non-return valve (21) connected to the low-pressure seawater inlet (7), at the beginning of the first discharge loop (2), mounted downstream of the first selecting valve (11), providing circulation of low-pressure seawater from the seawater inlet (7) towards the first discharge loop (2), allowing the inlet of seawater when the pressure at the beginning of the first d discharge loop (2) is below the seawater pressure (see FIG. 2A) and avoiding the outlet of seawater when the pressure at the same (2) is above the seawater pressure due to the inlet of high-pressure reject brine (see FIG. 2B),
- A second unidirectional non-return valve (22) connected to the low-pressure seawater inlet (7), at the beginning of the second discharge loop (3), mounted downstream of the first selecting valve (11), providing circulation of low-pressure seawater from the seawater inlet (7) towards the second discharge loop (3), allowing the inlet of seawater when the pressure at the beginning of the second discharge loop (3) is below the seawater pressure (see FIG. 2A) and avoiding the inlet of seawater when the pressure at the same (3) is above the seawater pressure due to the inlet of high-pressure reject brine (see FIG. 2B),
- A third unidirectional non-return valve (23) connected to the end of the first discharge loop (2) and to a by-pass line (8) of high-pressure seawater to the inlet of the RO membranes (100), mounted upstream of the second selecting valve (12), providing circulation of high-pressure seawater from the first loop (2) towards the by-pass (8) of high-pressure seawater at the inlet of the RO membranes (100), allowing the outlet of seawater to the RO membranes (100) when the pressure in the first discharge loop (2) increases due to the pushing of the high pressure reject brine and avoiding the outlet of reject brine (see FIG. 2A) through that by-pass line (8) when the pressure in the first discharge loop (2) is below the pressure at the inlet of the RO membranes (100),
- A fourth unidirectional non-return valve (24) connected to the end of the second discharge loop (3) and to a by-pass line (8) of high-pressure seawater to the inlet of the RO membranes (100), mounted upstream of the second selecting valve (13), providing circulation of high-pressure seawater from the second loop (3) towards the RO membranes (100), allowing the outlet of seawater to the RO membranes (100) when the pressure in the second discharge loop (3) increases due to the pushing of the high pressure reject brine and avoiding the outlet of reject brine (see FIG. 2A) through that by-pass line when the pressure in the second discharge loop (3) is below the pressure at the inlet of the RO membranes (100), and,
- Where the phases of the first selecting valve (11) and of the second selecting valve (12) are suited in a crossed manner.

Very preferably, the discharge loops (2,3) have spiral configuration once, this way, the following advantages are achieved:

- Can shelter all the valves (11, 12, 21, 22, 23, 24), reducing the size and the footprint of the ensemble.
- Allow the utilization of commercial non-return valves as much as common connecting elements.
- Allow the utilization of bended seamless commercial piping, as much as the reduction of the footprint of the plant.

Figure 3:
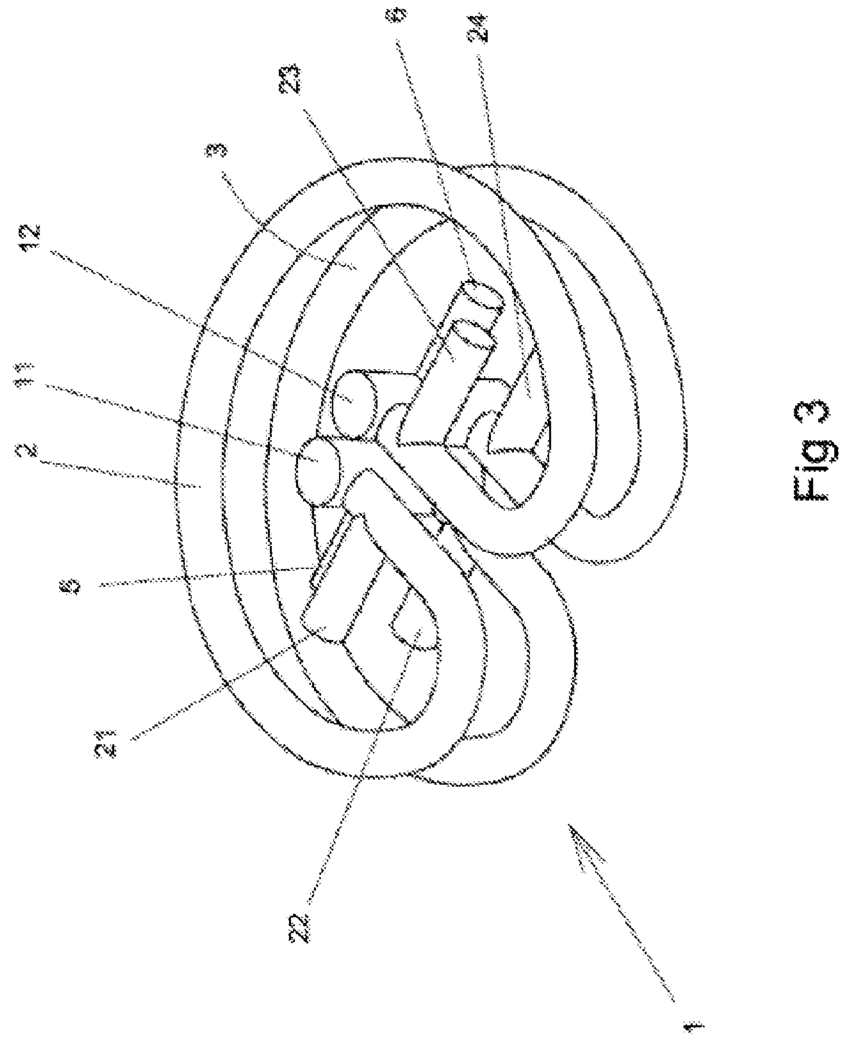
FIG. 3. —Shows an external view of the ensemble of the device of invention.

Within this execution, it is preferred that the discharge loops (2,3) have coil configuration with one or several spires, as seen in the FIG. 3, to minimize the friction losses of the fluids circulating through them. Furthermore, it is preferred that the spiral configuration has a curvature radius that is function of the section and comprised between 900 to 1900 mm, once this is the best compromise size/efficiency found in the computer aided test results.

Besides, in spiral configuration of the discharge loops, it is preferred a sheltered (20) configuration of the valves (11, 12, 21, 22, 23, 24).

For the selecting valves (11,12), wide rotating valves have been chosen to optimize the harnessing of all the pressure and velocity energy at the inlet of the high-pressure reject brine and to reduce the need of backpressure in the evacuation of the low-pressure reject brine.

In the scheme of the desalination plant (200) (FIG. 1), only the main elements in this kind of installations have been reflected, such as pumps (201), inlet filters (202), as much as the general inlet of seawater (203), the outlet of desalted water (204) from the RO membranes (100), the outlet of low-pressure reject brine (6) and the adjustment and position controlling servomotor (205) of the two rotating selecting valves (11,12).

Once the nature of the invention has been described, as much as the way to execute it in practice, it must be noted that the above-mentioned dispositions and the representations in the attached drawings are subject to detail modifications if they do not alter the fundamental principle.

The invention claimed is:

1. One-way pressure exchange device (1) for desalination plants by reverse osmosis, of the type comprising, at least, a pair of discharge loops (2,3) for the circulation of the entering low-pressure seawater flow in contact with another entering flow of high-pressure reject brine, for the transmission of the pressure differential of the entering reject brine to the entering seawater, prior to discharge to the RO desalination membranes (100); characterized by comprising:

- A first selecting valve (11) providing alternative entrance to the discharge loops (2,3), said first selecting valve (11) includes an outlet port connected to the inlet (4) of every pair of discharge loops (2,3) and an inlet port connected to the inlet of a collector (5) of high-pressure reject brine coming from the RO membranes (100),
- A second selecting valve (12) with alternative entrance from the discharge loops (2,3), said second selecting valve (12) includes an inlet port connected to the outlet (40) of every pair of d discharge loops (2,3) and an outlet port connected to the outlet of the collector (6) of low-pressure reject brine to evacuate it to the sea, A first unidirectional non-return valve (21) having an inlet port connected to the low-pressure seawater inlet (7), and an outlet port connected to the inlet (4) of the first discharge loop (2), providing circulation of low-pressure seawater directly from the seawater inlet (7) towards the first discharge loop (2), A second unidirectional non-return valve (22) having an inlet port connected to the low-pressure seawater inlet (7), and an outlet port connected to the inlet (4) of the second discharge loop (3), providing circulation of low-pressure seawater directly from the seawater inlet (7) towards the second discharge loop (3), A third unidirectional non-return valve (23) having an inlet port connected to the end of the first discharge loop (2) and an outlet port connected to a by-pass line (8) of high-pressure seawater to the inlet of the RO membranes (100), providing circulation of high-pressure seawater directly from the first loop (2) towards the by-pass (8) of high-pressure seawater at the inlet of the RO membranes (100), A fourth unidirectional non-return valve (24) having an inlet port connected to the end of the second discharge loop (3) and an outlet port connected to said to a-by-pass line (8) of high-pressure seawater to the inlet of the RO membranes (100), providing circulation of high-pressure seawater directly from the second loop (3) towards the RO membranes (100), and, Where the phases of the first selecting valve (11) and of the second selecting valve (12) are suited in a crossed manner.

2. One-way pressure exchange device (1) for desalination plants by reverse osmosis according to claim 1 where the discharge loops (2,3) have spiral configuration.

3. One-way pressure exchange device (1) for desalination plants by reverse osmosis according to claim 2 where the discharge loops (2,3) have coil configuration with one or several spiral.

4. One-way pressure exchange device (1) for desalination plants by reverse osmosis according to the claim 2 where the discharge loops (2,3) have spiral configuration with a curvature radius that is function of the section and comprised between 900 to 1900 mm.

5. One-way pressure exchange device (1) for desalination plants by reverse osmosis according to the claim 2 where the valves (11, 12, 21, 22, 23, 24) are sheltered in the discharge loops of the spiral configuration.

6. One-way pressure exchange device (1) for desalination plants by reverse osmosis according to claim 1 where the selecting valves (11, 12) are rotating valves.

* * * * *